(12) United States Patent
Blades et al.

(10) Patent No.: US 9,592,414 B1
(45) Date of Patent: Mar. 14, 2017

(54) FIELD-DEPLOYABLE HYDROLYSIS SYSTEM

(71) Applicant: U.S. Army Edgewood Chemical and Biological Command, APG, MD (US)

(72) Inventors: Timothy A. Blades, Street, MD (US); Raymond A. DiBerardo, Baltimore, MD (US); Adam P. Baker, Abingdon, MD (US); Jeffery A. Gonce, Perryville, MD (US); Jason J. Adamek, Baltimore, MD (US); Brian J. O'Donnell, Bel Air, MD (US); David J. Kline, Forest Hill, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 462 days.

(21) Appl. No.: 14/465,358

(22) Filed: Aug. 21, 2014

Related U.S. Application Data

(60) Provisional application No. 61/889,835, filed on Oct. 11, 2013.

(51) Int. Cl.
*A62D 3/35* (2007.01)
*B01J 19/24* (2006.01)
*A62D 101/02* (2007.01)

(52) U.S. Cl.
CPC .............. *A62D 3/35* (2013.01); *B01J 19/24* (2013.01); *A62D 2101/02* (2013.01); *B01J 2219/0002* (2013.01); *B01J 2219/00022* (2013.01)

(58) Field of Classification Search
CPC ............... A62D 3/35; A62D 2101/02; B01J 2219/0002; B01J 2219/00022; B01J 19/24
See application file for complete search history.

(56) References Cited

U.S. PATENT DOCUMENTS 5,714,128 A * 2/1998 Ritter ................. A62D 3/38
422/159
8,242,323 B2 * 8/2012 Jain .................... A62D 3/176
210/758

* cited by examiner

*Primary Examiner* — Lessanework Seifu
(74) *Attorney, Agent, or Firm* — Ulysses John Biffoni

(57) ABSTRACT

A transportable and modular field-deployable hydrolysis system for neutralizing toxic chemical agents is described. The system comprises a transportable chemical process plant that is capable of operating in a remote location without significant site infrastructure. The system is also capable of operating in a maritime, shipboard environment. A flexible design allows processing of chemical agents in both batch and continuous flow modes, as well as collection and accumulation of agents from a variety of containers whose form and size may not be known until the system is on-site.

27 Claims, 4 Drawing Sheets

FIELD-DEPLOYABLE HYDROLYSIS SYSTEM

CROSS-REFERENCE TO RELATED APPLICATIONS

This application claims the benefit of priority to U.S. Provisional Patent Application No. 61/889,835 filed on Oct. 11, 2013, the entire contents of which are incorporated by reference herein.

GOVERNMENT INTEREST

The invention described herein may be manufactured, used and/or licensed by or for the U.S. Government.

FIELD OF THE INVENTION

The invention relates to a method and apparatus for hydrolysis treatment of toxic liquid chemical agents and more particularly to a field-deployable hydrolysis system.

BACKGROUND

The safe destruction of chemical weapons has been an ongoing effort for many years. In the United States, permanent facilities have been built in several locations to dispose of stockpiles. However, chemical weapons are located in many countries around the world and permanent facilities are often impractical, if not impossible, to build in these locations.

Thus, a need exists for a chemical weapon disposal system and process that is portable and capable of being deployed and set up in temporary locations to demilitarize a range of bulk liquid chemical agents.

SUMMARY

The invention in one embodiment encompasses a field-deployable hydrolysis system that is a transportable, modular, chemical agent neutralization system. The system is a transportable chemical process plant that is capable of operating in a remote location without significant site infrastructure. The system is also capable of operating in a maritime environment such as on board ship.

A portable, field-deployable hydrolysis system for neutralizing toxic chemical agents according to the present invention includes a process component and a reactor component, flexibly coupled to a water source and one or more reagent sources. The process component includes a toxic chemical agent storage container, one or more static mixers coupled to the toxic chemical agent storage container, the water source and the one or more reagent sources and one or more pumps coupled to the toxic chemical agent storage container, the water source, the one or more reagent sources and the one or more static mixers. The reactor component includes a reactor for neutralizing toxic chemical agents and one or more pumps wherein the toxic chemical agents are combined with water and one or more reagents thereby using hydrolysis to neutralize the toxic chemical agents.

In another embodiment, the invention encompasses a portable, field-deployable hydrolysis system facility for neutralizing toxic chemical agents, said facility having a water tank, one or more reagent tanks, a process component contained within a first transportation structure, a reactor component contained within a second transportation structure, a process enclosure surrounding the first and second transportation structures, a carbon filtration system flexibly coupled to the process enclosure to draw air from inside the enclosure to provide filtration and negative air pressure within the enclosure, and one or more neutralent waste tanks flexibly coupled to the process component for storing neutralized toxic chemical agents after processing by the process component or the reactor component wherein the toxic chemical agents are combined with water and one or more reagents using hydrolysis to neutralize the toxic chemical agents.

Another embodiment of the invention encompasses a method of neutralizing toxic chemical agents comprising the steps of installing a portable, field-deployable hydrolysis system to neutralize toxic chemical agents, including the steps of transporting a process component to a location, said process component housed on a transportation skid and comprising at least a toxic chemical agent storage container, one or more static mixers, one or more pumps and interconnecting piping and valves; transporting a reactor component to the location, said reactor component housed on a transportation skid and further comprising at least a reactor for neutralizing toxic chemical agents, one or more pumps and interconnecting piping and valves; securing the process component and the reactor component adjacent to each other at the location; connecting piping in the process component to piping in the reactor component using flexible hoses; installing a process enclosure around the process component and reactor component; connecting a carbon filtration system to the process enclosure to draw air from inside the enclosure to provide filtration and negative air pressure within the enclosure; and connecting piping in the process and reactor components to a water tank, one or more reagent tanks and one or more neutralent waste tanks using flexible hoses.

DESCRIPTION OF THE DRAWINGS

Features of example embodiments of the invention will become apparent from the description, the claims, and the accompanying drawings in which:

DETAILED DESCRIPTION

Figure 1:
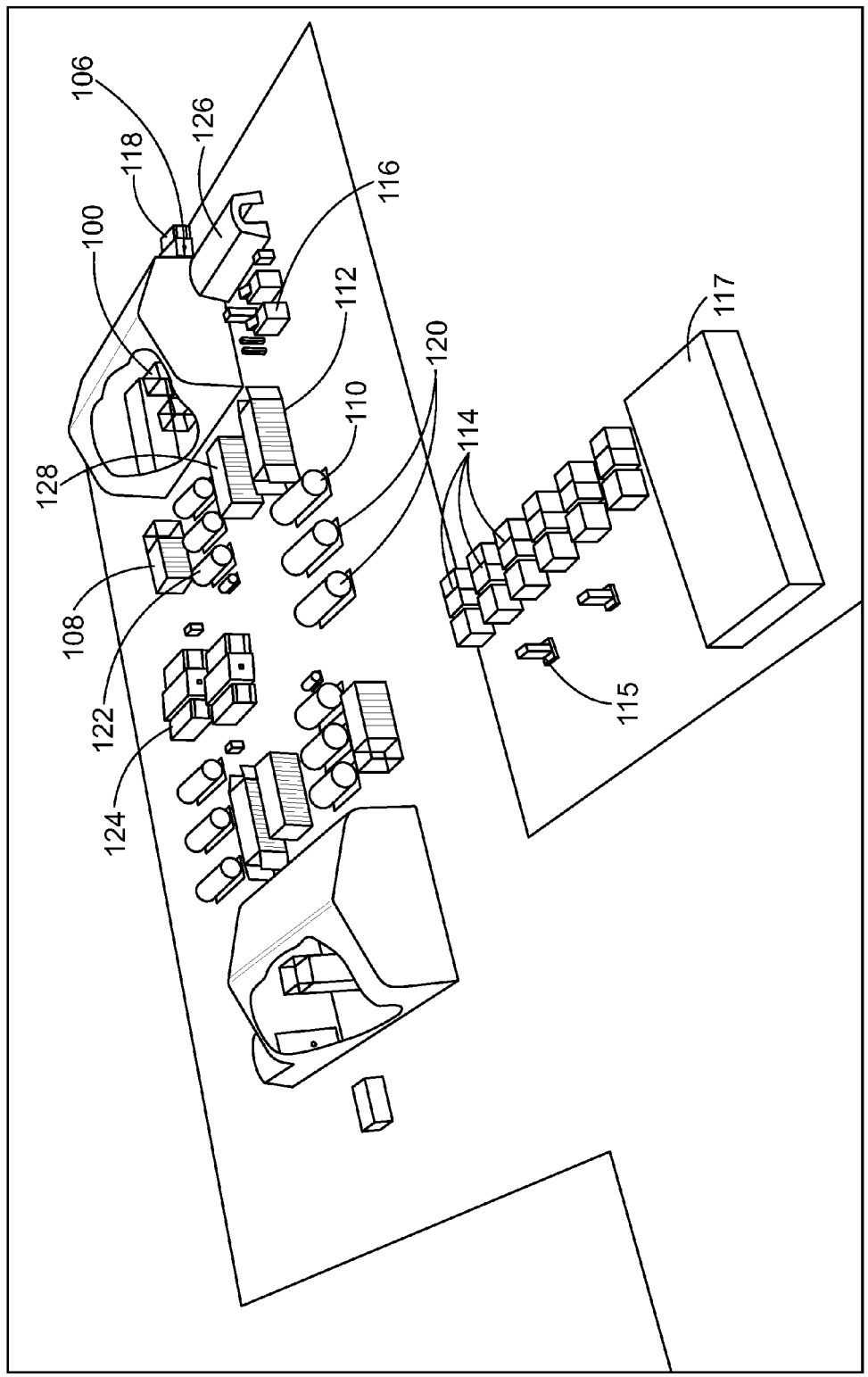
FIG. 1 depicts the equipment and operations layout used in a field deployable hydrolysis system (FDHS).

The field-deployable hydrolysis system (FDHS) is a transportable, modular, chemical agent neutralization system and process capable of being deployed and set up in temporary and remote locations to demilitarize a wide range of bulk liquid chemical agents. The system uses water and reagents to chemically neutralize highly toxic and/or lethal chemical agents, producing waste liquid effluent which is much safer than the original chemical agent. The system includes the equipment and instrumentation required to operate and monitor the process, including a mobile laboratory facility, but requires continuous operational support from the area supply authority for water, NaOCl, NaOH and other consumables to support process operations. While the invention is described in the context of neutralizing chemical agents using specific reagents, it can also be used to neutralize biological agents with the appropriate reagents as well.

The FDHS is a transportable chemical process plant, capable of operating in remote locations without significant site infrastructure. The system provides its own generated power, air, processing equipment, and lab facility to enable complete site operations. Consumables that are required to support operations include water, sodium hypochlorite (NaOCl), and sodium hydroxide (NaOH). Some minor site preparations may be required as the platform requires a level debris-free space. To support all required elements of FDHS operations, a footprint of approximately 300'×300' is required. The FDHS system is also capable of being set up in a maritime environment and is currently being used aboard ship to neutralize the Syrian chemical weapons stockpile.

The FDHS includes several interconnected systems, each of which will be discussed in turn. These systems include: (a) water/reagent supply, (b) agent access and accumulation, (c) neutralization reaction process, (d) neutralent waste accumulation, (e) utilities/support equipment and (f) laboratory facilities.

The general FDHS process flow involves the basic steps of combining water and reagent with a chemical agent, facilitating a neutralization reaction and disposing of neutralent waste.

Water/Reagent Supply

The FDHS requires inputs of large volumes of water, for example, up to 1800 gallons per batch, and/or reagent depending on the chemical being processed. Additionally, for the HD (mustard chemical agent) hydrolysis reaction, the water requires pre-heating to a temperature of approximately 190° F. in a preferred embodiment to maintain the required water temperature before introduction of an agent to the process. In an embodiment, reagent supply includes 12% NaOCl and 20% NaOH but any reagents could be used depending on the agent to be processed. For example, neutralization of biological material could require hydrogen peroxide or formaldehyde agents.

Agent Access and Accumulation

Because the form of the containers housing chemical agents is not pre-defined and will likely be unknown until the FDHS system is on-site, the system is capable of accumulating agent accessed by various means from bulk and/or multiple smaller containers. In this way, agent may be fed to the neutralization process at a consistent rate.

Neutralization Reaction Process

There are many different types of chemical agents which require neutralization. For this reason, the system is designed to be operated in several prescribed modes, for example, batch or continuous flow configurations, processing with or without static mixers or reactor agitation, and using multiple approved feed rates and agent/reagent ratios. This flexibility is required because certain reactions require significant agitation to ensure effective agent destruction. Other reactions occur instantaneously and do not require rigorous mixing. In addition, the exothermic nature of the process requires metered addition of agent to prevent boiling and steam generation. In order to manage the neutralization process, appropriate instrumentation is provided to monitor temperature, pressure, pH, fluid flow, and quantity of material processed. Instrumentation includes at least local and one remote read-out for process monitoring. All valves, pumps, generators, and compressors are operated manually during the FDHS process.

Neutralent Waste Accumulation

Significant volumes of neutralent must be collected at the end of the process. Neutralent from most reactions will be above ambient temperature. Additionally, neutralent waste will have low pH and may contain HCl or HF acids and therefore requires containers that will adequately house these materials. In a preferred embodiment, neutralent is cooled before ultimate storage in non-metallic containers, because they are typically not suitable for storing fluids at higher than 150° F. However, any appropriate container may be used to store neutralent.

Utilities/Support Equipment

The FDHS provides much of the utilities and support equipment required to operate internally, without requiring site support. These include power, compressed air for equipment and personnel support, lighting and facilities for operations personnel to don/doff personal protective equipment (PPE), and to store tools and component spares. Power capacity is sized to operate pumps, agitators, instrumentation, environmental control units, air supply, and other system equipment. Capability for decontamination of the system is integral to enable flushing and changeover.

Laboratory Facilities

The FDHS may also include a self-contained onsite laboratory to enable analysis of process samples. In a preferred embodiment, the lab is equipped to at least analyze samples to verify which chemical agents will be inputs to the process, as well as waste neutralent samples to verify destruction.

Figure 3:
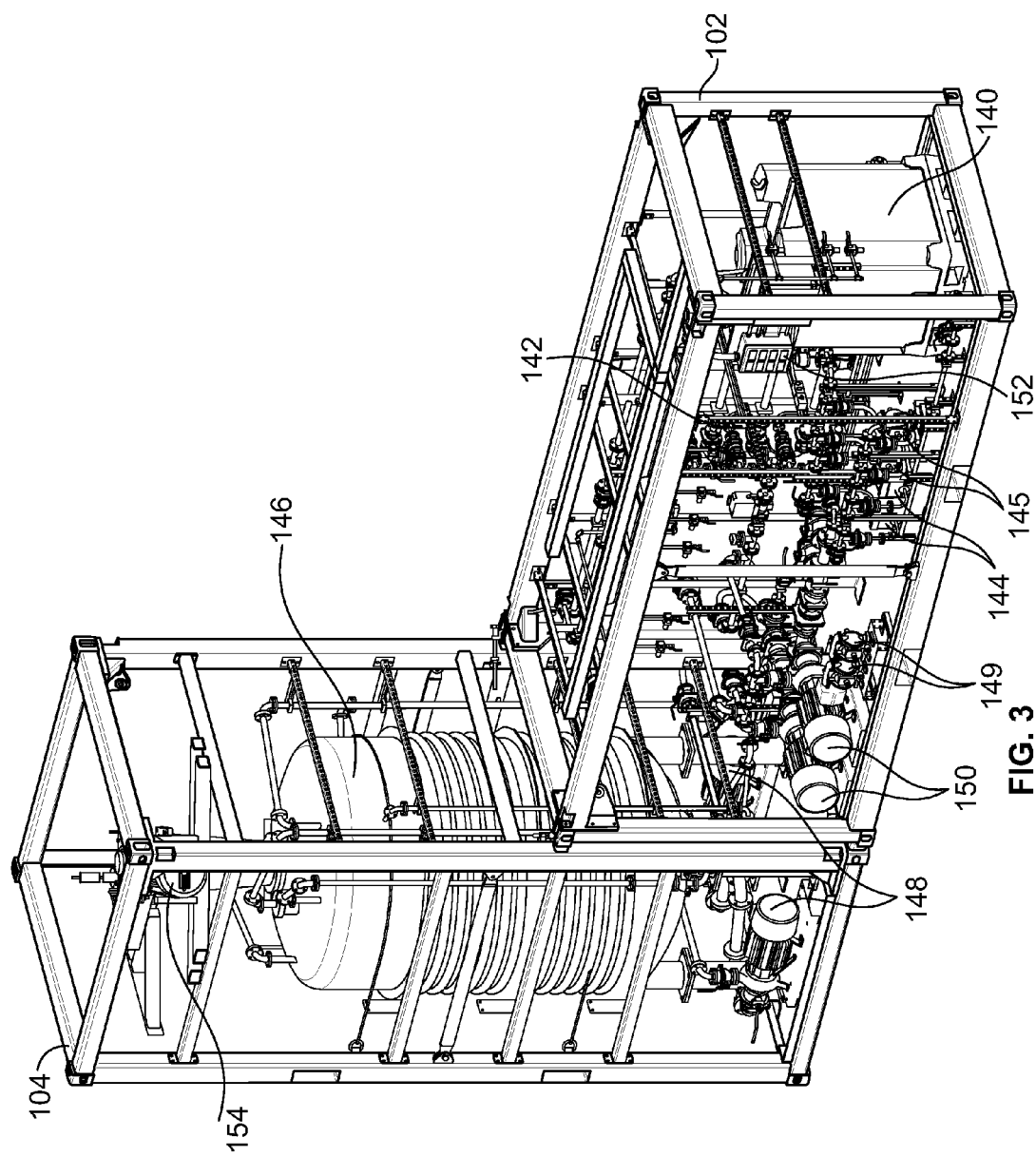
FIG. 3 depicts the process and reactor equipment used with the field deployable hydrolysis system.

A preferred embodiment of a land-based site layout for the FDHS 100 is shown in FIG. 1. A more detailed depiction of FDHS 100, including a primary process skid and a reactor skid, is shown in FIG. 3.

Primary Process Skid

Equipment to accomplish the neutralization reaction process is distributed over two skids, both approximately 8'×20'×8.5' feet. These dimensions are an industry standard for inter-model transportation but any appropriate dimension of skid could be used. The first skid, a primary process skid 102, houses a tank for bulk agent storage having an approximately 300 gallon capacity and static mixers used for both continuous flow and batch processing. This skid also houses process piping, pumps and valves. Flexible hose connections are available to connect this skid to an adjacent reactor skid 104. Primary process skid 102 will be described in more detail in connection with FIG. 3.

Reactor Skid

The second skid is a reactor skid 104 that houses a 2,200 gallon titanium reactor. Additional high-flow reagent and water pumps with associated piping and valves are also housed on this skid. Reactor skid 104 will be described in more detail in connection with FIG. 3.

Environmental Enclosure

In order to safely operate the FDHS 100, both the primary process 102 and reactor 104 skids are located in environmental enclosure 106 with carbon-based air filtration. In an embodiment, the enclosure is a General Purpose Outdoor Shelter (GPOS) with dimensions of 40'×58'×25' erected on site on a compacted, zero-grade area although any GPOS capable of accommodating reactor skid 104, which will be 20' tall when placed in operational configuration, may be used. The GPOS will be erected after reactor skid 104 and primary process skid 102 are in place, so that it does not interfere with the use of material handling equipment required for setup of these skids. To the greatest extent possible, accessing operations to transfer the contents of the original chemical agent storage containers to the bulk agent storage tank on primary process skid 102 will be performed inside the GPOS.

A 5,600-cfm carbon filtration system 108 is connected to environmental enclosure 106 to filter and remove agent vapors or VOCs (volatile organic compounds) within the enclosure. Filtration system 108 is not intended to provide a target rate of volumetric air changes within the enclosure, or any minimum pressure differential, but it will create a negative pressure within the enclosure with respect to ambient atmospheric pressure. This pressure differential ensures that air within the enclosure will not leak to the outside environment. For additional safety, operators will wear OSHA Level B and C personal protective equipment (PPE) during operations.

Figure 2:
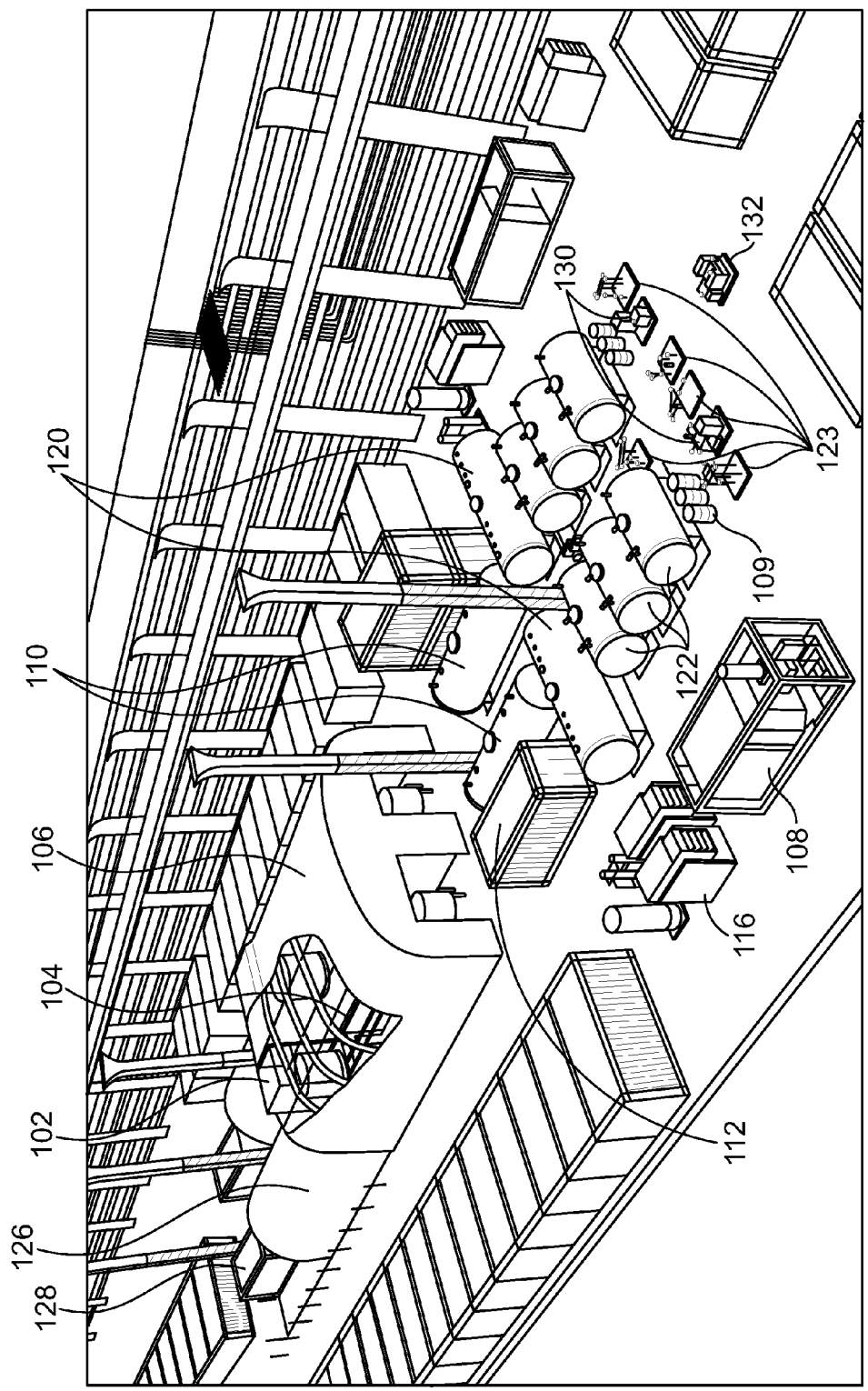
FIG. 2 depicts the field deployable hydrolysis system aboard ship in a maritime environment.

As an additional safety measure, vapors from the agent bulk storage tank and the reactor are captured from the top of these vessels and passed through caustic vent drum scrubbers 109, shown in FIG. 2, to capture and neutralize agent and acid gases. Vent drum scrubbers 109 pass vapors through two wet chambers and a third "knock out" chamber before air is pushed to the carbon filtration system.

Primary Water Tank

A 4000 gallon tank 110 is part of the shipped FDHS system. Tank 110 will be supplied via flexible hose connections to a water source at the site. This tank is also supplied with a recirculation heating system 112 that is designed to keep water in primary water tank 110 at a temperature set point when heating is required for a certain process. The use of primary water tank 110, and the maintenance of a fill level of greater than 50%, will allow operators to avoid the extended heating times that would be required to heat an entire container from ambient temperatures to the desired process feed temperature. Heating system 112 also connects to the reactor jacket, allowing hot water to flow into the reactor jacket to enable pre-heating of the reactor in cold environments upon start up of reactor processes that require heating.

Generators and Air Compressors

Three diesel-powered generators 114 are located outside environmental enclosure 106, and power all process equipment and ancillary equipment. In an embodiment, generators 114 are sized so that two generators are capable of powering all equipment on site including when water heating is required, with the third acting as a backup. Only one generator 114 is sufficient to power all equipment when water heating is not required. Transfer switch 115 facilitates switching between generators 114. Fuel for the generators is provided by fuel tank 117. The FDHS 100 also includes two air compressors 116 which provide compressed air to the air driven pumps, instrumentation cooling, and air supply to the bulk agent tank and reactor head space on the primary process skid. One compressor 116 is used at a time, with the other acting as a spare unit.

Electrical Distribution Panel

An electrical distribution panel 118 directs power to all powered equipment on site. As described above, one generator 114 is dedicated to powering the water tank heaters 112. The other two generators 114 are set up to power the rest of the site equipment, with one of the two acting as a backup, configured with an automatic transfer switch. The backup generator 114 also has the capability of being quickly rewired to power water tank heaters 112 in the event that the generator 114 dedicated for that purpose fails.

Reagent Tanks

Reagent tanks 120 are located outside environmental enclosure 106 and supply NaOH or NaOCl to the FDHS. As explained above, other reagents could be used depending on the agent to be neutralized. The NaOCl supply must be greater than 1,800 gallons, so that enough reagent can be supplied to fill the reactor for batch reactions. A continuous supply of additional NaOCl may be required depending on agent inventory at the site. NaOH can be provided in smaller quantities with a minimum amount of 300 gallons to be maintained at the site.

Neutralent Waste Tanks

In addition to reagent tanks 120, a number of neutralent waste tanks 122 are also located outside environmental enclosure 106. In an embodiment, three tanks with a capacity of greater than 4,000 gallons are available but any number and capacity could be used. The effluent lines from the process equipment run to common manifolds 123, shown in FIG. 2, used to connect to and deliver waste into the tanks. The tanks are connected to the manifolds 123 using flexible hoses and filled manually. The tanks are designed to accommodate extreme pH (hydrofluoric and hydrochloric acids) and temperatures up to 200° F. A second vent drum scrubber unit identical to the one connected to the Reactor and Agent Bulk Storage tanks is connected to vent lines capturing waste tank vapors and the carbon filtration system is used to ensure capture of agent and other harmful vapors coming from the neutralent in waste tanks 122 while it cools.

Optionally, neutralent bladders having a capacity of approximately 20,000 gallons can also be used for final storage of neutralent solutions after it cools in the waste tanks. The bladders are capable of being filled from waste tanks 122 using flexible hose connections and a neutralent pump placed between an initial hose connection and a bladder hose connection. Once filled, neutralent can be transferred from the bladders for transport or fixed on site for indefinite storage.

Ancillary Equipment

An expandable shelter 124 is provided on site away from the primary processing environmental enclosure 106 and houses all laboratory equipment. In a preferred embodiment, shelter 124 is shipped in an 8'×20'×8' configuration which has dimensions of 24'×20'×8' when expanded and set up on site. Generators 114 described above will provide power to the laboratory equipment. A personnel decontamination station (PDS) enclosure 126 is also provided at the entrance of environmental enclosure 106 to provide an area for decontamination of personnel leaving the operational area. In a preferred embodiment, enclosure 126 will be approximately 15'×20'.

Finally, a combined breathing air compressor and cascade system 128 is located outside the Environmental enclosure to supply air to personnel in the operational area. Approximately six supplied air lines will be provided in environmental enclosure 106 or PDS enclosure 126.

The elements of an FDHS environment as described above may be used as a single process environment, or can be doubled as shown in FIG. 2, where two systems are positioned adjacent one another aboard ship.

An alternative site layout for use with FDHS 100 in a maritime environment is shown in FIG. 2. Similar elements are marked with similar reference numerals. FIG. 2 also shows additional pumps 130 and 132 which are used to move fluids between various processing components and tanks as would be understood by one of ordinary skill in the art.

Further details of primary process skid 102 and reactor skid 104 are shown in FIG. 3. Reactor skid 104 houses reactor 146 which, in a preferred embodiment, is a 2,200 gallon titanium reactor equipped with an agitator 154. FDHS 100 is capable of incorporating reactor 146 into several different batch processing methods. For example, agent, water, and reagent can all be pumped directly to reactor 146. A set of high-flow pumps, described below, allows operators to set valve configurations to draw material from reactor 146 to either recirculate through the static mixers 142 or directly back to reactor 146 for extended mixing and reaction times, or drain directly to neutralent waste tanks 122 of FIG. 1.

Primary process skid 102 includes tank 140 having a capacity of at least 300 gallons for holding bulk chemical agent. In a preferred embodiment, tank 140 is constructed of HDPE and has connection points for lines to receive chemical agent pumped in from field containers. Tank 140 also includes a top vent connected to a caustic vent drum scrubber, a bottom drain into process agent lines and top mounted inlets to allow for tank wash-down between hydrolysis processes.

Static Mixers 142 includes two pairs of redundant static mixers although only one mixer is normally used. With redundant mixers, one can be isolated, removed, and replaced when required, since only one static mixer 142 will be used at a time. In a preferred embodiment, static mixers 142 are 30" long and contain six mixing elements targeting particle sizes of less than 100 microns during operation. One pair of static mixers 142 is made from titanium with a super alloy, for example, Hastelloy®, injection quill to process HD (distilled mustard chemical agent material) while the other pair is constructed entirely of a super alloy to accommodate neutralents that produce HF which is incompatible with titanium. Other construction materials could be used depending on the chemical agents to be neutralized.

A number of pumps are provided to move chemical agents, reagents, water and neutralent through the apparatus. In a preferred embodiment, FDHS 100 incorporates in-line spares to facilitate efficient operations in the event of pump failure. Flange fittings and valve configurations enable isolation of failed equipment allowing for field replacement when the operation is paused. For safety considerations, pumps are not intended to be removed while agent/precursor is being processed through the other pump.

Agent injection pumps 144 provide agent from bulk agent tank 140 to injection ports of static mixers 142 at low flows (approximately 1-5 gpm) and high pressures of up to 125 psi in a preferred embodiment. These high pressures overcome the flow and pressure of the reagent or recirculating neutralent passing through the static mixers.

Agent transfer pumps 145 transfer agent from original storage containers into tank 140, or into reactor 146 from either the original containers or tank 140. In a preferred embodiment, these pumps operate at flow rates of approximately 5 to 25 gpm at low pressures (higher flows but lower pressure than the agent injection pumps 144) and are made of a super alloy or other material according to the requirements of the chemical agents and reagents that will be processed.

Reagent and water pumps 150 are a set of redundant pumps with adjustable flows from approximately 25 to 100 gpm. These pumps transfer water or reagent into the system, directing it into static mixers 142 or reactor 146 or out to the neutralent tanks following agent injection at the static mixers. These pumps are also used during continuous operation mode as described below. Another set of similar pumps 148 are located on skid 104 for recirculation processes and draining of tank 146. These pumps transfer neutralent from reactor 146, recirculating back to reactor 146, through static mixers 142 or to neutralent waste tanks 122. In an embodiment, pumps 150 and 148 are polypropylene-lined.

Wash-down pumps 149 include two pumps similar to agent transfer pumps 145. These pumps are used to transfer water to primary water tank 110, water from primary water tank 110 through a hose connection and reagent from reagent tanks 120 to a hose connection. This set of pumps (one is redundant) use hose connections to flush out various parts of FDHS 100, or to decontaminate original agent storage containers.

Piping, flanges and valves to interconnect the above apparatus is also shown in FIG. 3. To accommodate the materials compatibility of multiple chemistries processed in FDHS 100, all piping is specified to be polytetrafluoroethylene (PTFE) lined ductile iron. All valves are perfluoroalkoxy alkane (PFA) lined ductile iron. These materials meet chemical and temperature compatibility requirements in a preferred embodiment but any suitable material could be used. Piping diameters are sized to accommodate the flow required for various operations of FDHS 100. For example, water and reagent lines are approximately 3" to match the inputs of pumps 148 and 150 and to accommodate using water/reagent for a process and rinsing or decontaminating simultaneously. Recirculation lines are approximately 1.5" to accommodate up to 70 gpm flow at a reasonable pressure. Agent lines are approximately 1" to be distinctive from the recirculation lines, and also to accommodate lower flow rates.

Piping and system components are preferably connected with flanges for interconnectivity of components to enhance ease of maintainability. Operators are able to disconnect piping at the flanges in order to remove and replace system components such as valves, gauges, pumps, or static mixers using hand tool only, without requiring welding operations. In a preferred embodiment, flanges are slip-style or floating 150# class and gasket material is made from PTFE, where required.

Ball valves are used liberally in order to isolate system components when maintenance is required. Backflow preventers (check valves) are also used to prevent agent or neutralent from entering parts of FDHS 100 that are not intended to accommodate the hazards associated with those materials.

Flexible hoses are used for any off-skid connections, including connections between primary process skid 102 and reactor skid 104. In a preferred embodiment, flexible hoses are polymer-lined with super alloy or non-metallic fittings where required for corrosion resistance.

FDHS 100 also includes instrumentation shown, for example, at 152 in FIG. 3. This instrumentation includes flowmeters, temperature and pressure gauges at appropriate intervals to measure process conditions before and after chemical component mixing. This instrumentation informs operators of operating conditions to ensure parameters such as flow, pressure, and temperature are optimal for the process. Remote readout for instrumentation provides ready access for operators to monitor these parameters.

Flow totalizers are used to determine how much neutralent has been transferred to neutralent waste tanks 122. A totalizer is also located on reactor skid 104 to measure total water or reagent added to the reactor tank for batch processing, as well as at the inlet to the static mixers to measure total water added to a continuous flow processing. They are also located at the outlets of agent injection pumps 144 to determine the amount of agent transferred to reactor 146 or static mixers 142.

FDHS 100 also includes one or more temperature gauges located in heater system 112 of primary water tank 110, in the recirculation loop piping prior to the static mixers 142, and at the exit of primary processing skid 102. Temperature gauges are also used with neutralent waste tanks 122 and inline for lines leading from waste tanks 122 to storage bladders if these are used.

Modes of Operation

FDHS 100 can be operated in both batch configuration using reactor 146 of FIG. 3 or continuous flow configuration using static mixers 142 of FIG. 3.

Figure 4:
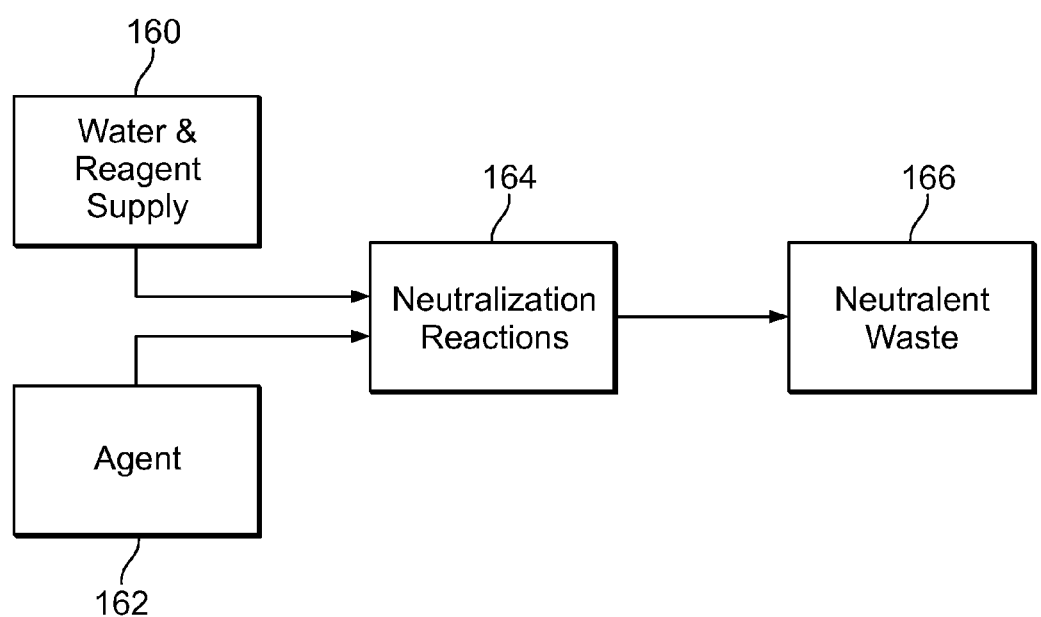
FIG. 4 provides a flowchart of the operation of the field deployable hydrolysis system.

Referring to FIG. 4, during batch operations water and reagent supply 160 and agent 162 can be pumped directly to reactor 146 where neutralization reactions 164 take place resulting in neutralent waste at 166. The batch processing may take place entirely in reactor 146, or may be pumped through a recirculation loop for extended mixing and reaction times. The recirculation loop may also include one or more passes through static mixers 142, which are configured to provide in-stream injection point for chemical agent. Batch processing can be operated with or without agitation, recirculation, or static mixers as required to neutralize any given chemical agent.

Continuous flow processing does not use reactor 146. This configuration supplies water and/or reagent to an inlet of static mixers 142 and supplies agent to static mixer 142 injection ports. Upon exiting static mixers 142, neutralent preferably flows directly to neutralent waste tanks 122.

Numerous alternative implementations of the present invention exist. Materials for the various components of FDHS 100 are selected based on the agents to be neutralized. In a preferred embodiment, materials are able to withstand temperatures up to at least 200° F. The materials should also be able to withstand up to 8% hydrofluoric acid (HF), at least 2% hydrochloric acid (HCl), at least 12% sodium hypochlorite (NaOCl) and at least 25% sodium hydroxide (NaOH). Materials that meet these various requirements, as explained in more detail above, include: Titanium Grade 2 and Grade 7 for reactors; a super alloy, for example, Hastelloy C276, for static mixers, agent transfer pumps, and water/reagent supply pumps; PTFE-lined ductile iron for piping; PFA-lined ductile iron for valves; PTFE for gaskets; epoxy lined reagent and waste tanks; polypropylene-lined pumps for high-flow reagent and neutralent pumps. PTFE-lined pumps for agent injection pumps and PTFE-lined flexible hoses with super alloy- or PTFE-lined fittings for connections can be used based on service conditions. One of ordinary skill in the art would understand how to select various pump, manifold, piping, and tank combinations to meet processing needs.

The steps or operations described herein are exemplary. There may be many variations to these steps or operations without departing from the spirit of the invention. For instance, the steps may be performed in a differing order, or steps may be added, deleted, or modified.

Although example embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A portable, field-deployable hydrolysis system for neutralizing toxic chemical agents, comprising:
    a process component, flexibly coupled to a water source and one or more reagent sources, and further comprising:
        a toxic chemical agent storage container;
        one or more static mixers coupled to the toxic chemical agent storage container, the water source and the one or more reagent sources; and
        one or more pumps coupled to the toxic chemical agent storage container, the water source, the one or more reagent sources and the one or more static mixers; and
    a reactor component, flexibly coupled to the water source, the one or more reagent sources and the process component, and further comprising:
        a reactor for neutralizing toxic chemical agents; and
        one or more pumps;
    wherein the toxic chemical agents are combined with water and one or more reagents using hydrolysis to neutralize the toxic chemical agents.

2. The portable, field-deployable hydrolysis system of claim 1, wherein the system is capable of being operated in both continuous flow and batch modes.

3. The portable, field-deployable hydrolysis system of claim 1, further comprising a first transportation skid housing said process component and a second transportation skid housing said reactor component.

4. The portable, field-deployable hydrolysis system of claim 3, further comprising a process enclosure surrounding the first and second transportation skids and the process and reactor components.

5. The portable, field-deployable hydrolysis system of claim 4, further comprising a carbon filtration system flexibly coupled to the process enclosure to draw air from inside the enclosure to provide air filtration and negative air pressure within the enclosure.

6. The portable, field-deployable hydrolysis system of claim 1, further comprising one or more neutralent waste tanks flexibly coupled to the process component for storing neutralized toxic chemical agents after processing by the process component or the reactor component.

7. The portable, field-deployable hydrolysis system of claim 1, further comprising one or more generators and an electrical distribution unit for providing electrical power to the system.

8. The portable, field-deployable hydrolysis system of claim 1, further comprising a laboratory facility for analysis of process samples and products.

9. A portable, field-deployable hydrolysis system for neutralizing toxic chemical agents, comprising:
    one or more water tanks;
    one or more reagent tanks;
    a process component, contained within a first transportation structure, flexibly coupled to the water tank and the one or more reagent tanks, and further comprising:
        a toxic chemical agent storage container;
        one or more static mixers coupled to the toxic chemical agent storage container, the water tank and the one or more reagent tanks; and
        one or more pumps coupled to the toxic chemical agent storage container, the water tank, the one or more reagent tanks and the one or more static mixers;
    a reactor component, contained within a second transportation structure, flexibly coupled to the water source, the one or more reagent sources and the process component, further comprising:
        a reactor for neutralizing toxic chemical agents; and
        one or more pumps coupled to the toxic chemical agent storage container, the water tank, the one or more reagent tanks and the one or more static mixers;
    a process enclosure surrounding the first and second transportation structures and the process and reactor components;

a carbon filtration system flexibly coupled to the process enclosure to draw air from inside the enclosure to provide air filtration and negative air pressure within the enclosure;

one or more neutralent waste tanks flexibly coupled to the process component for storing neutralized toxic chemical agents after processing by the process component or the reactor component; and wherein the toxic chemical agents are combined with water and one or more reagents using hydrolysis to neutralize the toxic chemical agents.

10. The portable, field-deployable hydrolysis system of claim 9, wherein the system is capable of being operated in both continuous flow and batch modes.

11. The portable, field-deployable hydrolysis system of claim 9, further comprising one or more generators and an electrical distribution unit for providing electrical power to the system.

12. The portable, field-deployable hydrolysis system of claim 9, further comprising a laboratory facility located outside said enclosure for analysis of process samples and products.

13. A method of neutralizing toxic chemical agents in field locations not having significant site infrastructure, comprising the steps of:

transporting a process component to said location, said process component housed in a transportation skid and comprising at least a toxic chemical agent storage container, one or more static mixers, one or more pumps and interconnecting piping and valves;

transporting a reactor component to the remote location, said reactor component housed in a transportation skid and further comprising at least a reactor for neutralizing toxic chemical agents, one or more pumps and interconnecting piping and valves;

securing the process component and the reactor component adjacent to each other at the remote location;

connecting piping in the process component to piping in the reactor component using flexible hoses;

installing a process enclosure around the process component and reactor component;

connecting a carbon filtration system to the process enclosure to draw air from inside the enclosure to provide air filtration and negative air pressure within the enclosure; and connecting piping in the process and reactor components to a water tank, one or more reagent tanks and one or more neutralent waste tanks using flexible hoses.

14. A portable, field-deployable hydrolysis system for neutralizing toxic chemical agents, comprising:

a process enclosure;

a hydrolysis system positioned inside said enclosure, said hydrolysis system including a toxic chemical storage container, static mixers, a reactor, water pumps, chemical agent pumps, recirculation pumps, and associated piping and valves;

a primary water tank positioned outside the enclosure;

water heaters connected to said water tank for receiving water from said tank, and connected to said water pumps to deliver heated water to said pumps;

a carbon filtration system positioned outside said enclosure and connected to the interior of said enclosure in order to draw air out of said enclosure and filter and remove chemical agents in said air and to create a negative pressure within the enclosure with respect to atmospheric pressure outside the enclosure; and reagent tanks located outside the enclosure and connected to said hydrolysis system, said tanks storing reagents used for neutralization of said toxic chemical agents.

15. The system of claim 14, further comprising a mobile laboratory located outside said enclosure for analysis of process samples and products.

16. The system of claim 14, further comprising generators and an electrical distribution unit for providing electrical power to components of said field-deployable hydrolysis system.

17. The system of claim 14, further comprising a caustic vent drum scrubber positioned inside said enclosure to capture and neutralize vapors from said reactor, static mixers, and said chemical storage container.

18. The system of claim 14, further comprising air compressors located outside said enclosure to provide air to components of said field-deployable hydrolysis system.

19. The system of claim 14, further comprising neutralent waste tanks located outside said enclosure and connected to said hydrolysis system for receiving and storing effluent waste from said hydrolysis system.

20. The system of claim 14, further comprising a personal decontamination station connected to said enclosure adapted to provide an area for decontamination of personnel leaving said enclosure.

21. The system of claim 14, wherein said reactor comprises a titanium reactor vessel having an internal agitation system.

22. The system of claim 14, wherein said reagents comprise sodium hydroxide and sodium hypochlorite.

23. The system of claim 14, wherein said static mixers are comprised of Hastelloy C276.

24. The system of claim 14, wherein said static mixers are comprised of titanium.

25. The system of claim 14, wherein said static mixers contain six mixing elements targeting particle size of less than 100 microns during operation.

26. The system of claim 14, wherein said piping is comprised of PTFE-lined ductile iron.

27. The system of claim 14, wherein said valves are comprised of PFA-lined ductile iron.

* * * * *